US009057940B2

(12) United States Patent
Chen et al.

(10) Patent No.: US 9,057,940 B2
(45) Date of Patent: Jun. 16, 2015

(54) LIGHT SOURCE MODULE AND PROJECTION APPARATUS FOR SWITCHING ILLUMINATION BETWEEN WAVELENGTH CONVERSION ELEMENT AND REFLECTION ELEMENT

(71) Applicants: Ko-Shun Chen, Hsin-Chu (TW); Tzu-Yi Yang, Hsin-Chu (TW); Chia-Hao Wang, Hsin-Chu (TW)

(72) Inventors: Ko-Shun Chen, Hsin-Chu (TW); Tzu-Yi Yang, Hsin-Chu (TW); Chia-Hao Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 230 days.

(21) Appl. No.: 13/678,499

(22) Filed: Nov. 15, 2012

(65) Prior Publication Data
US 2013/0278902 A1      Oct. 24, 2013

(30) Foreign Application Priority Data

Apr. 24, 2012   (CN) ............................ 2012 1 0122019

(51) Int. Cl.
*G03B 21/20* (2006.01)
*H04N 9/31* (2006.01)
*G03B 33/08* (2006.01)

(52) U.S. Cl.
CPC .......... *G03B 21/204* (2013.01); *G03B 21/2066* (2013.01); *H04N 9/3161* (2013.01); *G03B 33/08* (2013.01)

(58) Field of Classification Search
CPC .. G03B 21/20; G03B 21/2033; G03B 21/204; G03B 21/2066; G03B 21/2093; H04N 9/31; H04N 9/3114; H04N 9/3117; H04N 9/3161; H04N 3/3164

USPC ................ 353/30–31, 37, 84–85, 94, 98–99; 359/885, 887, 889–892; 362/84, 362/217.08, 230–231, 235–236, 260, 293

See application file for complete search history.

(56) References Cited

U.S. PATENT DOCUMENTS

| 6,601,959 B2* | 8/2003 | Miyata et al. .................... 353/98 |
| 7,547,114 B2* | 6/2009 | Li et al. .......................... 362/231 |

(Continued)

FOREIGN PATENT DOCUMENTS

| CN | 101822066 | 9/2010 |
| CN | 101937161 | 1/2011 |

(Continued)

OTHER PUBLICATIONS

"Office Action of China Counterpart Application," issued on Dec. 1, 2014, p. 1-p. 9.

*Primary Examiner* — Jori S Reilly-Diakun
(74) *Attorney, Agent, or Firm* — Jianq Chyun IP Office

(57) ABSTRACT

A projection apparatus has a light source module including a light-emitting element, an optical path switching element, a wavelength conversion element, a first reflection element, and a first beam splitter element. The optical path switching element switches a first color beam between a first optical path and a second optical path. When the first color beam is switched to the first optical path, the first color beam is propagated to the wavelength conversion element to excite a first and second wavelength conversion layers on the wavelength conversion element to produce a second color beam and a third color beam. When the first color beam is switched to the second optical path, the first color beam is propagated to the first reflection element.

17 Claims, 9 Drawing Sheets

(56) References Cited

U.S. PATENT DOCUMENTS

| | | | |
|---|---|---|---|
| 7,628,495 B2* | 12/2009 | Tangen | 353/94 |
| 7,874,677 B2* | 1/2011 | Chien et al. | 353/7 |
| 8,000,019 B2* | 8/2011 | Kato | 359/629 |
| 8,016,422 B2* | 9/2011 | Silverstein et al. | 353/20 |
| 8,231,224 B2* | 7/2012 | Powell et al. | 353/20 |
| 8,231,227 B2* | 7/2012 | Kurosaki | 353/31 |
| 8,237,872 B2* | 8/2012 | Hwang et al. | 348/743 |
| 8,342,697 B2* | 1/2013 | Iwanaga | 353/94 |
| 8,348,432 B2* | 1/2013 | Miyazaki | 353/31 |
| 8,393,741 B2* | 3/2013 | Fukano | 353/85 |
| 8,403,492 B2* | 3/2013 | Shibasaki | 353/31 |
| 8,434,875 B2* | 5/2013 | Masuda | 353/85 |
| 8,469,520 B2* | 6/2013 | Maeda | 353/98 |
| 8,523,367 B2* | 9/2013 | Ogura | 353/84 |
| 8,562,146 B2* | 10/2013 | Kitano et al. | 353/84 |
| 8,616,710 B2* | 12/2013 | Fukano | 353/85 |
| 8,662,673 B2* | 3/2014 | Miyazaki | 353/31 |
| 8,794,765 B2* | 8/2014 | Shibasaki et al. | 353/31 |
| 2005/0117028 A1* | 6/2005 | Imaizumi et al. | 348/222.1 |
| 2010/0046234 A1 | 2/2010 | Abu-Ageel | |
| 2010/0085541 A1* | 4/2010 | Chen | 353/31 |
| 2010/0149496 A1* | 6/2010 | Inoue | 353/98 |
| 2010/0328632 A1* | 12/2010 | Kurosaki et al. | 353/98 |
| 2011/0096300 A1 | 4/2011 | Shibasaki | |
| 2011/0292349 A1* | 12/2011 | Kitano et al. | 353/31 |
| 2012/0019786 A1* | 1/2012 | Kimura | 353/31 |
| 2012/0026472 A1* | 2/2012 | Masuda | 353/85 |
| 2012/0243205 A1* | 9/2012 | Lin | 362/84 |
| 2013/0010264 A1* | 1/2013 | Takahashi et al. | 353/20 |
| 2013/0033682 A1* | 2/2013 | Hsu et al. | 353/33 |
| 2013/0033683 A1* | 2/2013 | Hsu et al. | 353/33 |
| 2013/0044296 A1* | 2/2013 | Hsu et al. | 353/33 |
| 2013/0100421 A1* | 4/2013 | Hsu et al. | 353/33 |
| 2013/0107222 A1* | 5/2013 | Hsu et al. | 353/31 |
| 2013/0107226 A1* | 5/2013 | Aksenov | 353/31 |
| 2013/0215397 A1* | 8/2013 | Matsubara | 353/57 |
| 2013/0222772 A1* | 8/2013 | Matsubara | 353/31 |
| 2013/0242534 A1* | 9/2013 | Pettitt et al. | 362/84 |
| 2013/0250255 A1* | 9/2013 | Kurosaki et al. | 353/85 |
| 2013/0322056 A1* | 12/2013 | Konuma et al. | 362/84 |
| 2014/0071182 A1* | 3/2014 | Takahashi et al. | 345/690 |
| 2014/0071407 A1* | 3/2014 | Takahashi et al. | 353/31 |
| 2014/0071408 A1* | 3/2014 | Takahashi et al. | 353/31 |
| 2014/0132937 A1* | 5/2014 | Daniels | 353/98 |

FOREIGN PATENT DOCUMENTS

| | | |
|---|---|---|
| CN | 102289140 | 12/2011 |
| CN | 102289141 | 12/2011 |
| CN | 102314060 | 1/2012 |
| TW | 201100864 | 1/2011 |
| TW | 201126254 | 8/2011 |
| WO | 2012022241 | 2/2012 |

* cited by examiner

LIGHT SOURCE MODULE AND PROJECTION APPARATUS FOR SWITCHING ILLUMINATION BETWEEN WAVELENGTH CONVERSION ELEMENT AND REFLECTION ELEMENT

CROSS-REFERENCE TO RELATED APPLICATION

This application claims the priority benefit of China application serial no. 201210122019.4, filed on Apr. 24, 2012. The entirety of the above-mentioned patent application is hereby incorporated by reference herein and made a part of this specification.

BACKGROUND

1. Technical Field

The invention relates to an optical apparatus. Particularly, the invention relates to a light source module and a projection apparatus.

2. Related Art

Along with development of display technology, besides that a projection apparatus uses an ultra high pressure lamp (UHP lamp) emitting a white light in collaboration with a color wheel to sequentially produce a red light, a green light and a blue light in order to achieve a color image frame of the projection apparatus, a light-emitting diode (LED) is further developed to serve as a light source of the projection apparatus. However, a light-emitting efficiency of the LED has a limitation, and in recent years, in order to break the limitation of the light-emitting efficiency of the LED, a technique of using laser to excite phosphor powder to produce the pure color light source required by the projection apparatus is gradually developed.

Regarding a known laser projection apparatus, in a light source design, a blue-ray laser is used to excite fluorescent powder of different positions on a color wheel, so as to respectively produce the red light and the green light. Since the red light and the green light are produced by exciting the fluorescent powder through the blue-ray laser, such optical design can reduce usage of red LEDs and green LEDs.

However, the blue-ray laser cannot be directly guided to a light combining system of the light source for utilization, so that usage efficiency of the high intensity and high purity laser light source is decreased.

Taiwan Patent Publication No. 201126254 discloses a projection apparatus including a laser light source and a wavelength conversion element. Taiwan Patent Publication No. 201100864 discloses an optical device having a characteristic of light offset according to different light incident angles. Moreover, U.S. Patent Publication No. 20110096300 discloses a projection apparatus including an excitation light irradiation device and a fluorescent light-emitting device.

SUMMARY

The invention is directed to a light source module with high color purity.

The invention is directed to a projection apparatus with high color purity.

Additional aspects and advantages of the invention could be further understood from the technical features disclosed herein.

To achieve one, a part or all of the objectives, or other objectives of the invention, an embodiment of the invention provides a light source module including a light-emitting element, an optical path switching element, a wavelength conversion element, a first reflection element and a first beam splitter element. The light-emitting element is adapted to emit a first color beam. The optical path switching element is disposed on a propagating path of the first color beam, and the optical path switching element switches the first color beam between a first optical path and a second optical path. The wavelength conversion element is disposed on the first optical path. The wavelength conversion element includes a first wavelength conversion layer and a second wavelength conversion layer, and the first wavelength conversion layer and the second wavelength conversion layer are switched to the first optical path in alternation. The first reflection element is disposed on the second optical path, wherein when the first color beam is switched to the first optical path by the optical path switching element, the first color beam respectively excites the first wavelength conversion layer and the second wavelength conversion layer to produce a second color beam and a third color beam, and when the first color beam is switched to the second optical path by the optical path switching element, the first color beam is propagated to the first reflection element. The first beam splitter element is disposed on a propagating path of the first color beam, the second color beam and the third color beam, and the first beam splitter element is adapted to reflect the second color beam and the third color beam, and be passed by the first color beam.

According to the above descriptions, in the light source module and the projection apparatus of an embodiment of the invention, by using the optical path switching element, the high pure color light emitted by the light-emitting element could be directly used, such that the light source module and the projection apparatus have a high color purity.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

The invention will now be described more fully with reference to the accompanying drawings, in which exemplary embodiments of the invention are shown. The terms used herein such as "above", "below", "front", "back", "left" and "right" are for the purpose of describing directions in the figures only and are not intended to be limiting of the invention.

First Embodiment

Figure 1:
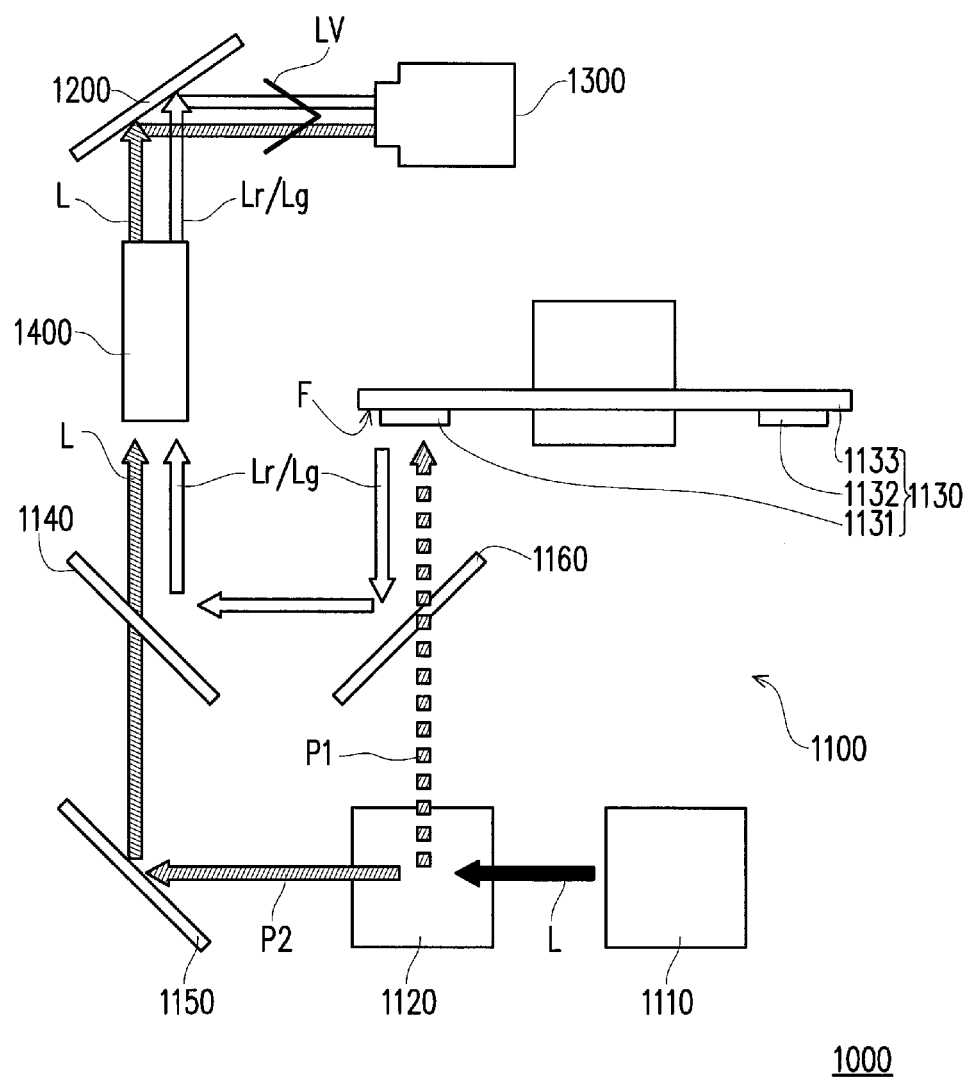
FIG. 1 is a schematic diagram of a projection apparatus according to a first embodiment of the invention.

FIG. 1 is a schematic diagram of a projection apparatus according to the first embodiment of the invention. Referring to FIG. 1, the projection apparatus 1000 of the embodiment includes a light source module 1100, a light valve 1200 and a projection lens 1300. The light source module 1100 includes a light-emitting element 1110, an optical path switching element 1120, a wavelength conversion element 1130, a first beam splitter element 1140 and a first reflection element 1150. The light-emitting element 1110 emits a first color beam L. The optical path switching element 1120 is disposed on a propagating path of the first color beam L, and the optical path switching element 1120 switches the first color beam L between a first optical path P1 and a second optical path P2. In the embodiment, the light-emitting element 1110 may be a blue-ray laser or other solid-state light source providing a blue waveband. Further, the light-emitting element 1110 is, for example, a plurality of laser light sources providing a plurality of beams arranged in an array. However, the invention is not limited thereto, and in other embodiment, the light-emitting element 1110 may also be a light source providing a single beam. The wavelength conversion element 1130 is disposed on the first optical path P1. The wavelength conversion element 1130 includes a first wavelength conversion layer 1131 and a second wavelength conversion layer 1132. In detail, the wavelength conversion element 1130 further includes a carrier plate 1133. The carrier plate 1133 has a reflection surface F, and the first wavelength conversion layer 1131 and the second wavelength conversion layer 1132 are respectively disposed at different regions on the reflection surface F.

When the optical path switching element 1120 switches the first color beam L to the first optical path P1, the first color beam L irradiates the wavelength conversion element 1130. The carrier plate 1133 of the wavelength conversion element 1130 adapted to rotate, such that the first wavelength conversion layer 1131 and the second wavelength conversion layer 1132 located at different regions on the reflection surface F are switched to the propagating path of the first color beam L in alternation. When the first color beam L irradiates the first wavelength conversion layer 1131, the first color beam L is converted into a second color beam Lr. When the first color beam L irradiates the second wavelength conversion layer 1132, the first color beam L is converted into a third color beam Lg. The second color beam Lr and the third color beam Lg are reflected by the reflection surface F, and depart from the wavelength conversion element 1130.

As shown in FIG. 1, the first beam splitter element 1140 is disposed on a propagating path of the second color beam Lr and the third color beam Lg. In the embodiment, the light source module 1100 further includes a second beam splitter element 1160 disposed on the first optical path P1 and located between the wavelength conversion element 1130 and the optical path switching element 1120. After the first color beam L passes through the second beam splitter element 1160, the first color beam L is propagated to the wavelength conversion element 1130, and is converted into the second color beam Lr and the third color beam Lg. The second color beam Lr and the third color beam Lg are reflected by the reflection surface F of the wavelength conversion element 1130 and are propagated to the second beam splitter element 1160. Then, the second color beam Lr and the third color beam Lg are reflected to the first beam splitter element 1140 by the second beam splitter element 1160. The first beam splitter element 1140 then reflects the second color beam Lr and the third color beam Lg to the light valve 1200. In the embodiment, the second color beam Lr is, for example, a red beam, and the third color beam Lg is, for example, a green beam, though the invention is not limited thereto.

In the embodiment, the first wavelength conversion layer 1131 and the second wavelength conversion layer 1132 of the wavelength conversion element 1130 include fluorescent layers corresponding to different color light wavebands, where the color light wavebands are, for example, red light waveband and green light waveband, though the invention is not limited thereto. Moreover, the first and the second beam splitter elements 1140 and 1160 may be dichroic filters. The first and the second beam splitter elements 1140 and 1160 could be passed by light of a specific waveband, and reflect light beams of the other wavebands (for example, the red beam and the green beam). For example, in the present embodiment, the first and the second beam splitter elements 1140 and 1160 could be passed by the blue light. Therefore, when the first color beam L is converted into the second and the third color beams Lr and Lg by the first and the second wavelength conversion layers 1131 and 1132 for propagating to the first and the second beam splitter elements 1140 and 1160, the non-blue second and third color beams Lr and Lg are reflected by the first and the second beam splitter elements 1140 and 1160.

Referring to FIG. 1 again, in the embodiment, the first color beam L could be switched to the second path P2 by the optical path switching element 1120. The first reflection element 1150 on the second optical path P2 could reflect the first color beam L to the first beam splitter element 1140. The first beam splitter element 1140 is passed by the first color beam L.

Further, the first beam splitter element 1140 is disposed on the propagating path of the first color beam L, the second color beam Lr and the third color beam Lg, and the first beam splitter element 1140 is passed by the first color beam L and reflects the second color beam Lr and the third color beam Lg. Therefore, after being processed by the first beam splitter element 1140, the first color beam L (for example, the blue beam), the second color beam Lr (for example, the red beam) and the third color beam Lg (for example, the green beam) are propagated to the same direction for light combination. The various color beams are propagated to the light valve 1200 after passing the first beam splitter element 1140, and are converted into an image beam LV by the light valve 1200.

As shown in FIG. 1, the projection lens 1300 is disposed on a propagating path of the image beam LV for projecting the image beam LV onto a screen (not shown). In this way, image frames could be imaged on the screen. Moreover, in the embodiment, the light valve 1200 is, for example, a digital micro-minor device (DMD). However, in other embodiments, the light valve 1200 may also be a liquid-crystal-on-silicon panel, a transmissive liquid crystal panel or other suitable spatial light modulators (SLM).

The projection device 1000 of the present embodiment further includes a light uniforming element 1400. The light uniforming element 1400 is disposed on the propagating path of the first color beam L, the second color beam Lr and the third color beam Lg, and is located between the light source module 1100 and the light valve 1200. The light uniforming element 1400 of the present embodiment is, for example, a light integration rod, though the invention is not limited thereto.

A plurality of preferable implementations of the optical path switching element 1120 is introduced below to further describe operation details of the optical path switching element 1120.

Figure 2A:
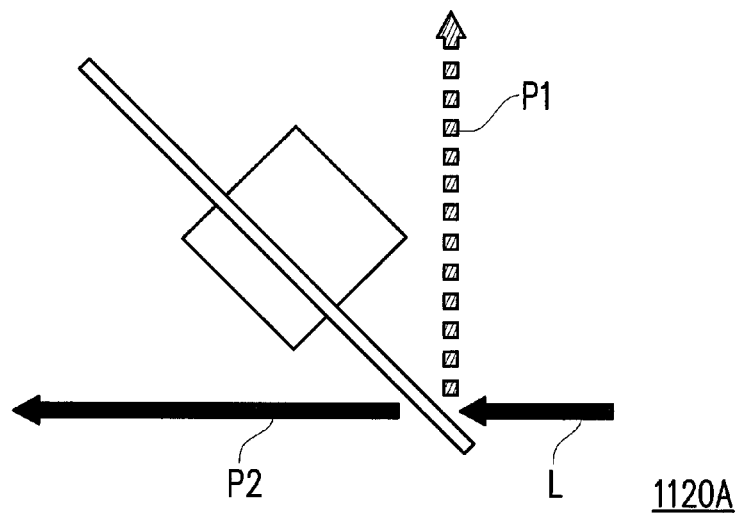
FIG. 2A is a schematic diagram of an optical path switching element according to an embodiment of the invention.
Figure 2B:
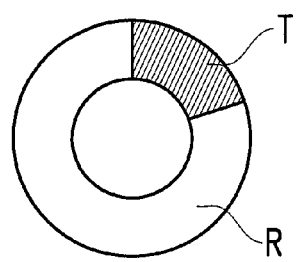
FIG. 2B is a front view of FIG. 2A.

FIG. 2A is a schematic diagram of an optical path switching element according to an embodiment of the invention, FIG. 2B is a front view of FIG. 2A. Referring to FIG. 2A and FIG. 2B, the optical path switching element 1120A may be an optical wheel. The optical wheel has a transmissive area T and a reflective area R, where the transmissive area T and the reflective area R are adjacent to each other or separated by a gap. The optical wheel adapted to rotate to alternately switch the transmissive area T and the reflective area R to the propagating path of the first color beam L. When the first color beam L is propagated to the reflective area R, the first color beam L is reflected by the reflective area R and switched to the first optical path P1. When the first color beam L is propagated to the transmissive area T, the first color beam L passes through the transmissive area T and enters the second optical path P2.

Figure 3:
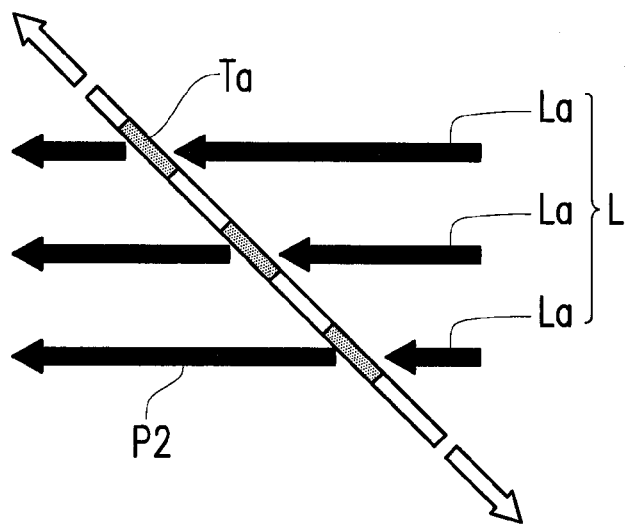
FIG. 3 is a schematic diagram of an optical path switching element according to another embodiment of the invention.
Figure 3:
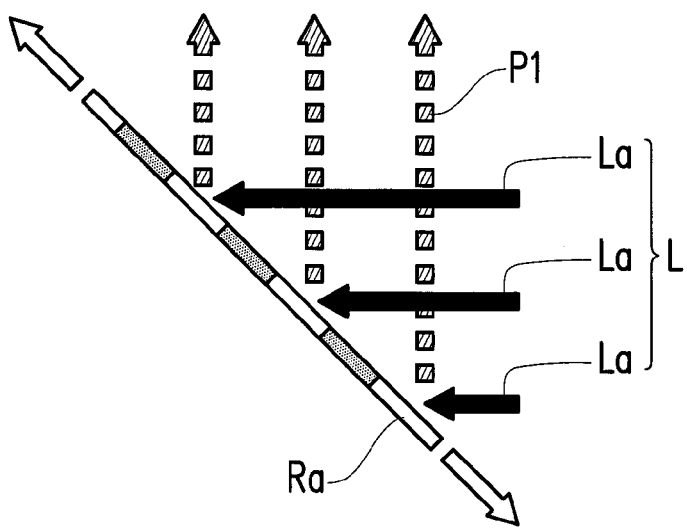

FIG. 3 is a schematic diagram of an optical path switching element according to another embodiment of the invention. Referring to FIG. 3, the optical path switching element 1120B of the embodiment may be a bar-shape lens. The bar-shape lens has a plurality of transmissive areas Ta and a plurality of reflective areas Ra. It should be noticed that the optical path switching element 1120B is preferably used in collaboration with a light source capable of emitting a plurality of independent light beams. Such light source is, for example, a plurality of laser diodes arranged in an array, and these laser diodes are used for emitting a plurality of sub beams La separated to each other, and these sub beams La form the first color beam L.

In FIG. 3, the bar-shape lens (i.e. the optical path switching element 1120B) adapted to be moved back and forth, so that the transmissive areas Ta and the reflective areas Ra alternately enter the propagating path of the sub beams La. When the sub beams La are propagated to the reflective areas Ra, the sub beams La are reflected by the reflective areas Ra and switched to the first optical path P1. When the sub beams La are propagated to the transmissive areas Ta, the sub beams La pass through the transmissive areas Ta to enter the second optical path P2.

Figure 4:
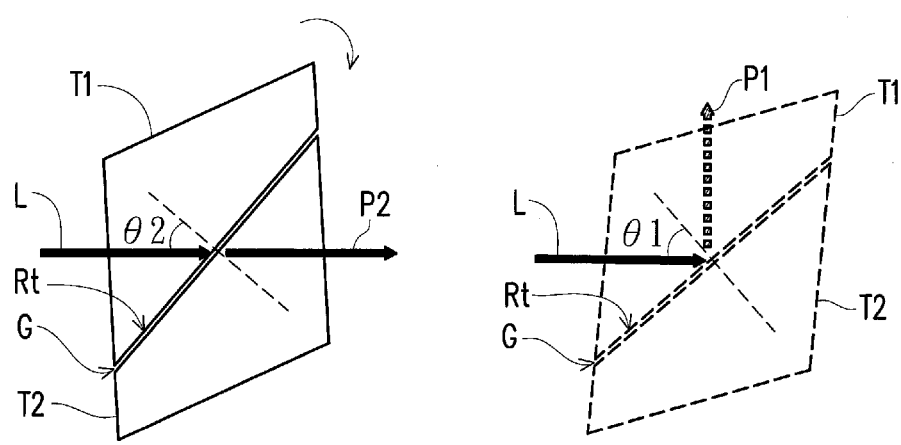
FIG. 4 is a schematic diagram of an optical path switching element according to still another embodiment of the invention.

FIG. 4 is a schematic diagram of an optical path switching element according to still another embodiment of the invention. Referring to FIG. 4, the optical path switching element 1120C may be a total internal reflection prism (TIR prism). The TIR prism includes a first prism T1 and a second prism T2. A gap G exists between the first prism T1 and the second prism T2. The first prism T1 has total reflection surface Rt. The TIR prism could be rotated back and forth, for example, rotated by ±4°. In this way, the first color beam L could be incident to the total reflection surface Rt from different angles. When the first color beam L is incident to the total reflection surface Rt through a first angle θ1, the first color beam L could be reflected to the first optical path P1 by the total reflection surface Rt. When the first color beam L is incident to the total reflection surface Rt through a second angle θ2, the first color beam L could pass through the total reflection surface Rt to enter the second optical path P2. Further, the first angle θ1 is greater than or equal to a threshold angle, and the second angle θ2 is smaller than the threshold angle. The threshold angle is equal to $\sin^{-1}(N_G/N_{T1})$, where $N_G$ is refractive index of the environment of the gap G, and $N_{T1}$ is a refractive index of the first prism T1.

Figure 5:
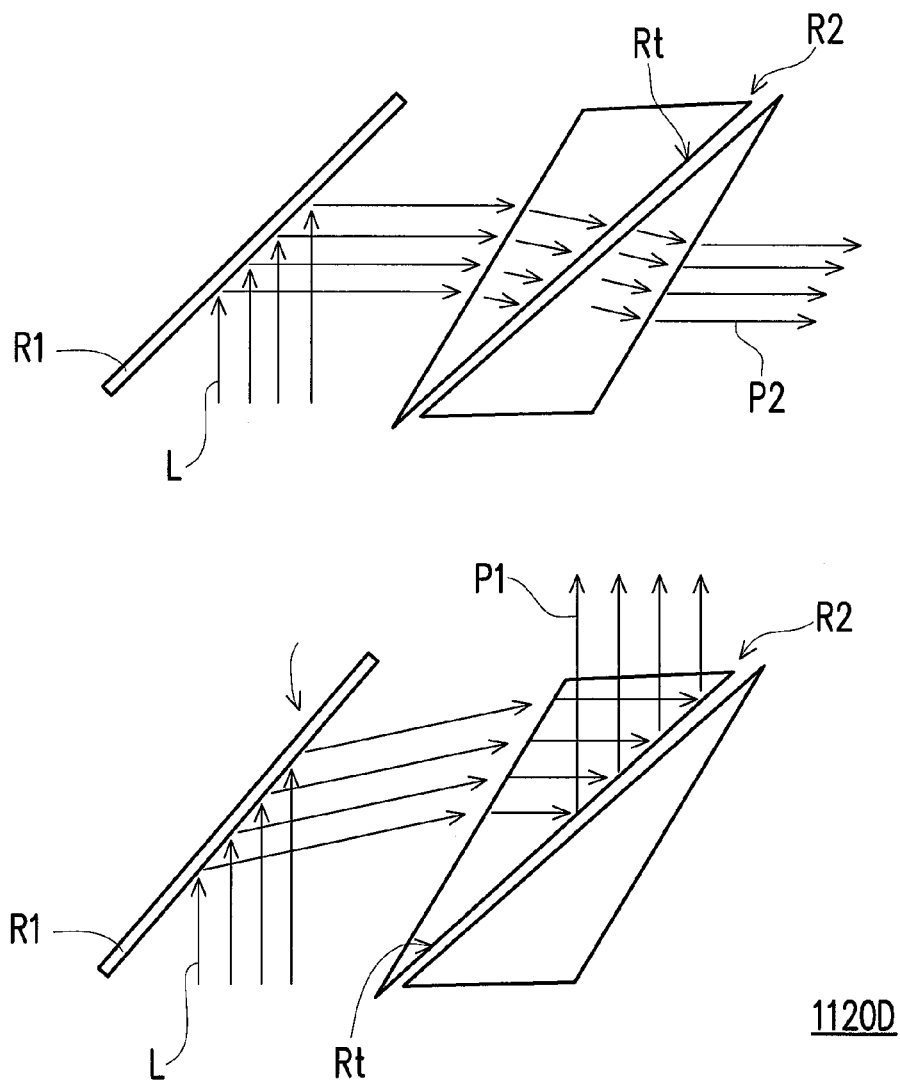
FIG. 5 is a schematic diagram of an optical path switching element according to yet another embodiment of the invention.

FIG. 5 is a schematic diagram of an optical path switching element according to yet another embodiment of the invention. Referring to FIG. 5, the embodiment of FIG. 5 is similar to the embodiment of FIG. 4, and a main difference there between is that the optical path switching element 1120D of FIG. 5 includes a reflector R1 and a TIR prism R2. In FIG. 5, the reflector R1 could be rotated, and the TIR prism R2 could be fixed. When the reflector R1 is rotated, an angle that the first color beam L is incident to the total reflection surface Rt of the TIR prism R2 is changed. Since the incident angle of the first color beam L is changed through the reflector R1, the propagating path of the first color beam L could be flexibly changed. For example, the first color beam L could be switched between the first optical path P1 and the second optical path P2 by only rotating the reflector R1 by ±3°. In other words, the optical path switching element 1120D could swiftly switch the optical path. The embodiment of FIG. 4 could be referred for detailed descriptions of the TIR prism, and details thereof are not repeated.

Figure 6:
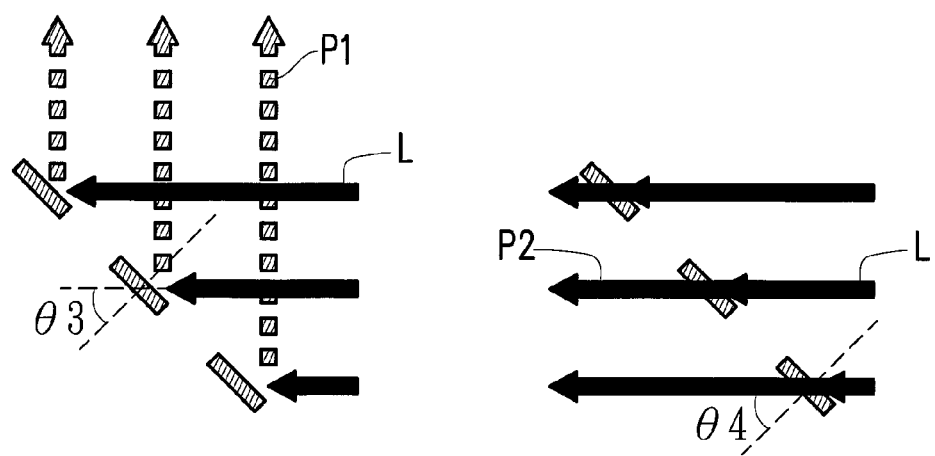
FIG. 6 is a schematic diagram of an optical path switching element according to still another embodiment of the invention.

FIG. 6 is a schematic diagram of an optical path switching element according to still another embodiment of the invention. Referring to FIG. 6, the optical path switching element 1120E may be a dichroic filter. The dichroic filter could be rotated, so that the first color beam L could be incident to the dichroic filter through different angles. The dichroic filter presents different light transmittances for the lights with different incident angles. For example, when the incident angle is relatively large, the light transmittance is relatively low. Therefore, when the first color beam L is incident to the dichroic filter through a larger incident angle θ3 (for example, 45°), the first color beam L is reflected by the dichroic filter and switched to the first optical path P1. When the first color beam L is incident to the dichroic filter through a smaller incident angle θ4 (for example, 35°), the first color beam L passes through the dichroic filter to enter the second optical path P2.

Figure 7:
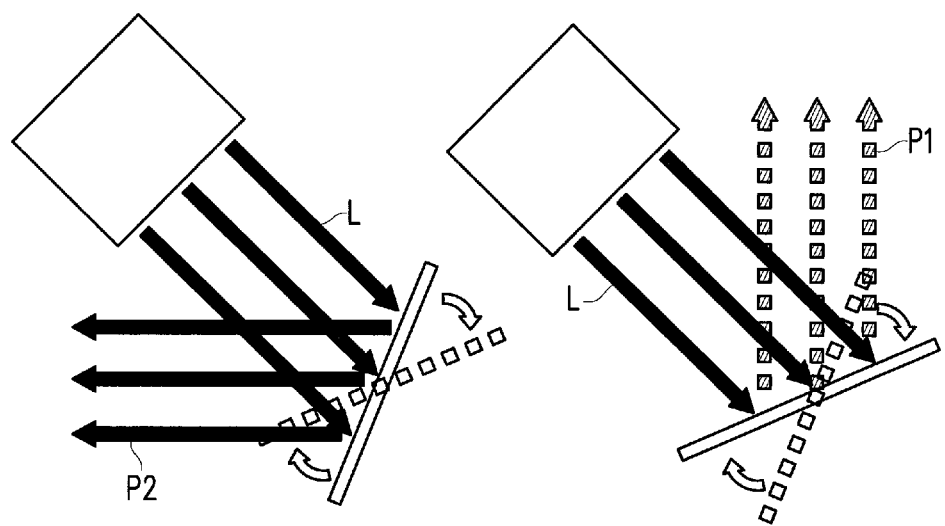
FIG. 7 is a schematic diagram of an optical path switching element according to still another embodiment of the invention.

FIG. 7 is a schematic diagram of an optical path switching element according to still another embodiment of the invention. Referring to FIG. 7, the optical path switching element 1120F may be a reflector. The reflector could be rotated back and forth along an axis thereof, for example, rotated back and forth by ±22.5°. In this way, the first color beam L could be sequentially reflected to the first optical path P1 and the second optical path P2.

Second Embodiment

Figure 8:
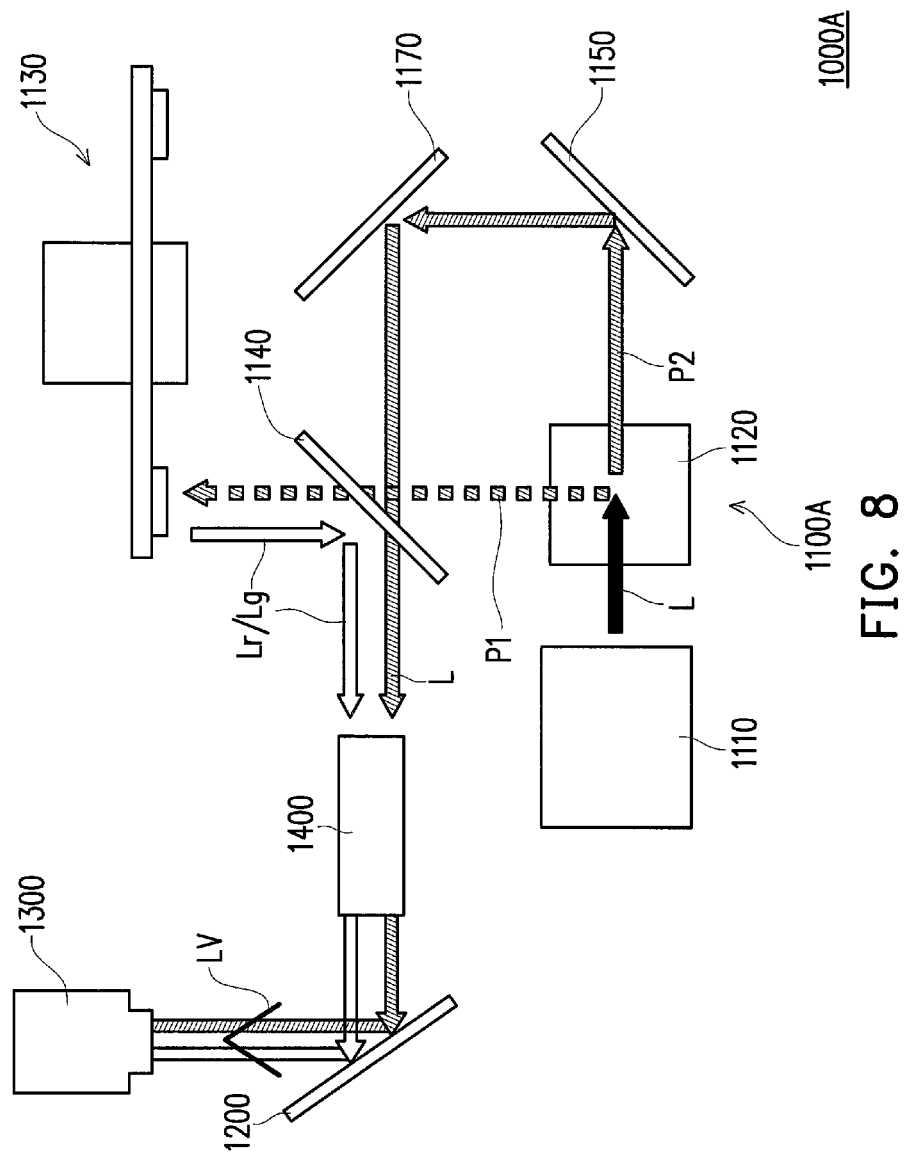
FIG. 8 is a schematic diagram of a projection apparatus according to a second embodiment of the invention.

FIG. 8 is a schematic diagram of a projection apparatus according to the second embodiment of the invention. The projection apparatus 1000A of FIG. 8 is similar to the projection apparatus 1000 of FIG. 1, and like reference numerals refer to the same elements. Main differences between the projection apparatus 1000A of the embodiment and the projection apparatus 1000 of the first embodiment are that in a light source module 1100A of FIG. 8, a second reflection element 1170 is further configured, and the second reflection element 1170 is used to reflect the first color beam L propagated by the first reflection element 1150. Moreover, the light source module 1100A does not have the second beam splitter element 1160, and the first beam splitter element 1140 is disposed between the wavelength conversion element 1130 and the optical path switching element 1120. The differences between the projection apparatus 1000A and the projection apparatus 1000 are described below, and the same parts are not repeated.

When the first color beam L is switched to the first optical path P1 by the optical path switching element 1120, the first color beam L passes through the first beam splitter element 1140 and is propagated to the wavelength conversion element 1130. The wavelength conversion element 1130 converts the first color beam L into the second color beam Lr and the third color beam Lg, and the second color beam Lr and the third color beam Lg are reflected to the first beam splitter element 1140 by the wavelength conversion element 1130, and the second color beam Lr and the third color beam Lg are further reflected to the light uniforming element 1400 by the first beam splitter element 1140.

When the first color beam L is switched to the second optical path P2 by the optical path switching element 1120, the first reflection element 1150 propagates the first color beam L to the second reflection element 1170. Then, the first color beam L is further reflected to the first beam splitter element 1140 by the second reflection element 1170. The first beam splitter element 1140 is passed by the first color beam L. In this way, the first, the second and the third color beams L, Lr and Lg are propagated towards the same direction, and are merged to enter the light uniforming element 1400.

Third Embodiment

Figure 9:
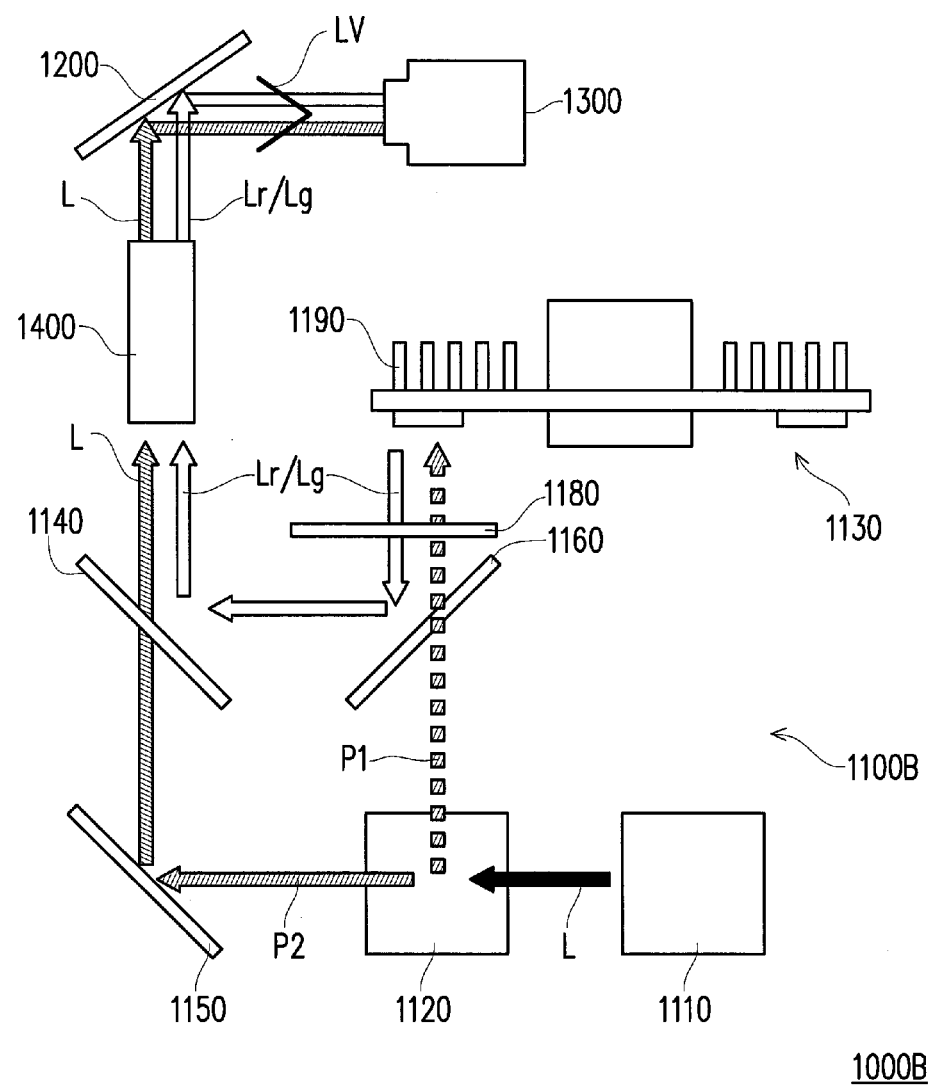
FIG. 9 is a schematic diagram of a projection apparatus according to a third embodiment of the invention.

FIG. 9 is a schematic diagram of a projection apparatus according to the third embodiment of the invention. The projection apparatus 1000B of FIG. 9 is similar to the projection apparatus 1000 of FIG. 1, and like reference numerals refer to the same elements. A main difference between the projection apparatus 1000B of the embodiment and the projection apparatus 1000 of the first embodiment is that a light source module 1100B of the projection apparatus 1000B further includes a filter element 1180 disposed between the wavelength conversion element 1130 and the second beam splitter element 1160, and a heat dissipating element 1190 connected to the wavelength conversion element 1130. The difference between the projection apparatus 1000B and the projection apparatus 1000 is described below, and the same parts are not repeated.

In the embodiment, the filter element may be a filter, and the heat dissipating element 1190 may be a heat sink. In detail, the heat dissipating element 1190 could be disposed at the back of the wavelength conversion element 1130 to strengthen a cooling effect, so as to effectively dissipate the heat generated by the first color beam L irradiating the wavelength conversion element 1130. Therefore, the fluorescent powder used by the wavelength conversion layers 1131 and 1132 may have a lower heat resistance, and the color beam generated by such fluorescent powder has a narrower spectrum, which may enhance color purity of various color beams in the projection apparatus.

Moreover, the filter element 1180 located between the wavelength conversion element 1130 and the second beam splitter element 1160 could filter an overlap part of the spectrum of the second color beam Lr and the spectrum of the third color beam Lg. In this way, purity of the second color beam Lr and the third color beam Lg is further enhanced.

The first embodiment could be referred for detailed descriptions of the projection apparatus 1000B, and details thereof are not repeated.

In summary, in the embodiments of the invention, the high purity color light emitted from the light emitting element could be directly used through the optical path switching element, so as to enhance the color purity of the projection apparatus.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents. Moreover, any embodiment or claim of the invention is unnecessary to achieve all advantages or characteristics disclosed by the invention. In addition, the abstract and the name of the invention are only used to assist patent searching, which are not used to limit the range of the claims. Moreover, the "first beam splitter element", the "second beam splitter element", etc. referred in the specification are merely used to name the elements and should not be regarded as limiting the upper or lower bound of the number of the components/devices.

What is claimed is:

1. A light source module, comprising:

a light-emitting element, adapted to emit a first color beam;

an optical path switching element, disposed on a propagating path of the first color beam, and the optical path switching element switching the first color beam between a first optical path and a second optical path, wherein the optical path switching element comprises a reflector, and the reflector is adapted to rotate to sequentially reflect the first color beam to the first optical path and the second optical path;

a wavelength conversion element, disposed on the first optical path, and comprising a first wavelength conversion layer and a second wavelength conversion layer, wherein the first wavelength conversion layer and the second wavelength conversion layer are switched to the first optical path in alternation;

a first reflection element, disposed on the second optical path, wherein when the first color beam is switched to the first optical path by the optical path switching element, the first color beam respectively excites the first wavelength conversion layer and the second wavelength conversion layer to produce a second color beam and a third color beam, and when the first color beam is switched to the second optical path by the optical path switching element, the first color beam is propagated to the first reflection element; and a first beam splitter element, disposed on a propagating path of the first color beam, the second color beam and the third color beam, the first beam splitter element is adapted to reflect the second color beam and the third color beam, and be passed by the first color beam, wherein the light source module further comprises a filter element disposed on the first optical path and located between the wavelength conversion element and the optical path switching element, and at least a portion of the second color beam and a portion of the third color beam from the wavelength conversion element pass through the filter element.

2. The light source module as claimed in claim 1, further comprising a second beam splitter element disposed on the first optical path, wherein the first color beam passes through the second beam splitter element and is propagated to the wavelength conversion element, and the second color beam from the first wavelength conversion layer and the third color beam from the second wavelength conversion layer are reflected to the first beam splitter element by the second beam splitter element.

3. The light source module as claimed in claim 1, wherein the wavelength conversion element further comprises a carrier plate, the carrier plate has a reflection surface, and the first wavelength conversion layer and the second wavelength conversion layer are respectively disposed at different regions on the reflection surface.

4. The light source module as claimed in claim 1, wherein the light-emitting element comprises a plurality of laser diodes, the laser diodes emit a plurality of sub beams, and the sub beams form the first color beam.

5. The light source module as claimed in claim 1, wherein the reflector is a total internal reflection prism, and the total internal reflection prism is adapted to rotate and has a total reflection surface.

6. The light source module as claimed in claim 1, wherein the optical path switching element further comprises a total internal reflection prism, the total internal reflection prism has a total reflection surface, and the first color beam is reflected to the total reflection surface by the reflector, wherein the reflector rotates relative to the total reflection surface to change an incident angle of the first color beam incident to the total reflection surface.

7. The light source module as claimed in claim 1, further comprising a second reflection element, and the second reflection element reflects the first color beam from the first reflection element to the first beam splitter element.

8. The light source module as claimed in claim 1, further comprising a heat dissipating element connected to the wavelength conversion element.

9. A projection apparatus, comprising:
   a light source module, comprising:
      a light-emitting element, adapted to emit a first color beam;
      an optical path switching element, disposed on a propagating path of the first color beam, and the optical path switching element switching the first color beam between a first optical path and a second optical path, wherein the optical path switching element comprises a reflector, and the reflector is adapted to rotate to sequentially reflect the first color beam to the first optical path and the second optical path;
      a wavelength conversion element, disposed on the first optical path, and comprising a first wavelength conversion layer and a second wavelength conversion layer, wherein the first wavelength conversion layer and the second wavelength conversion layer are switched to the first optical path in alternation;
      a first reflection element, disposed on the second optical path, wherein when the first color beam is switched to the first optical path by the optical path switching element, the first color beam respectively excites the first wavelength conversion layer and the second wavelength conversion layer to produce a second color beam and a third color beam, and when the first color beam is switched to the second optical path by the optical path switching element, the first color beam is propagated to the first reflection element; and
      a first beam splitter element, disposed on a propagating path of the first color beam, the second color beam and the third color beam, the first beam splitter element is adapted to reflect the second color beam and the third color beam, and be passed by the first color beam;
   a light valve, disposed on the propagating path of the first color beam, the second color beam and the third color beam, and convert the color beams into an image beam; and
   a projection lens, disposed on a propagating path of the image beam
   wherein the light source module further comprises a filter element disposed on the first optical path and located between the wavelength conversion element and the optical path switching element, and at least a portion of the second color beam and a portion of the third color beam from the wavelength conversion element pass through the filter element.

10. The projection apparatus as claimed in claim 9, further comprising a light uniforming element disposed on the propagating path of the first color beam, the second color beam and the third color beam, and located between the light source module and the light valve.

11. The projection apparatus as claimed in claim 9, further comprising a second beam splitter element disposed on the first optical path, wherein the first color beam passes through the second beam splitter element and is propagated to the wavelength conversion element, and the second color beam from the first wavelength conversion layer and the third color beam from the second wavelength conversion layer are reflected to the first beam splitter element by the second beam splitter element.

12. The projection apparatus as claimed in claim 9, wherein the wavelength conversion element further comprises a carrier plate, the carrier plate has a reflection surface, and the first wavelength conversion layer and the second wavelength conversion layer are respectively disposed at different regions on the reflection surface.

13. The projection apparatus as claimed in claim 9, wherein the light-emitting element comprises a plurality of laser diodes, the laser diodes emit a plurality of sub beams, and the sub beams form the first color beam.

14. The projection apparatus as claimed in claim 9, wherein the reflector is a total internal reflection prism, and the total internal reflection prism is adapted to rotate and has a total reflection surface.

15. The projection apparatus as claimed in claim 9, wherein the optical path switching element further comprises a total internal reflection prism, the total internal reflection prism has a total reflection surface, and the first color beam is reflected to the total reflection surface by the reflector, wherein the reflector rotates relative to the total reflection surface to change an incident angle of the first color beam incident to the total reflection surface.

16. The projection apparatus as claimed in claim 9, further comprising a second reflection element, and the second reflection element reflects the first color beam from the first reflection element to the first beam splitter element.

17. The projection apparatus as claimed in claim 9, further comprising a heat dissipating element connected to the wavelength conversion element.

* * * * *